United States Patent [19]

Zinsky et al.

[11] Patent Number: 5,963,142
[45] Date of Patent: *Oct. 5, 1999

[54] SECURITY CONTROL FOR PERSONAL COMPUTER

[75] Inventors: Timothy R. Zinsky, Houston; Charles N. Shaver, Cypress; Roger A. Kaiser, Jr.; Paul B. Rawlins, both of Spring, all of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/779,061

[22] Filed: Jan. 6, 1997

Related U.S. Application Data

[63] Continuation of application No. 08/779,061, Jan. 6, 1997, which is a continuation of application No. 08/398,343, Mar. 3, 1995, abandoned.

[51] Int. Cl.[6] .................................................. G06F 12/14
[52] U.S. Cl. ............................... 340/825.34; 340/825.31; 380/4; 380/25; 395/188.01; 711/164; 707/9
[58] Field of Search ........................ 340/825.31, 825.34; 380/4, 23, 25, 3; 395/186, 188.01; 711/164, 163; 707/9; 364/709.05

[56] References Cited

U.S. PATENT DOCUMENTS

| | | | |
|---|---|---|---|
| 3,890,601 | 6/1975 | Pietrolewicz | 340/172.5 |
| 4,891,838 | 1/1990 | Faber | 340/825.34 X |
| 4,942,606 | 7/1990 | Kaiser et al. | 380/4 |
| 4,959,860 | 9/1990 | Watters et al. | 380/4 |
| 5,060,263 | 10/1991 | Bosen et al. | 340/825.31 X |
| 5,173,940 | 12/1992 | Lantz et al. | 380/25 |
| 5,212,729 | 5/1993 | Schafer | 380/4 |
| 5,265,163 | 11/1993 | Golding et al. | 380/25 |
| 5,313,639 | 5/1994 | Chao | 380/25 X |
| 5,355,414 | 10/1994 | Hale et al. | 380/25 |
| 5,375,243 | 12/1994 | Parzych et al. | 395/725 |
| 5,377,343 | 12/1994 | Yaezawa | 380/3 X |
| 5,388,156 | 2/1995 | Blackledge, Jr. et al. | 380/4 |
| 5,451,934 | 9/1995 | Dawson et al. | 340/825.31 |
| 5,475,762 | 12/1995 | Morisawa et al. | 340/825.31 X |
| 5,533,125 | 7/1996 | Bensimon et al. | 380/4 |
| 5,537,544 | 7/1996 | Morisawa et al. | 380/25 X |

FOREIGN PATENT DOCUMENTS 2 154 344  9/1985  United Kingdom ..................... 380/25

OTHER PUBLICATIONS

COMPAQ DESKPRO/M Reference Guide, pp. 5–1 through 5–13. No Date.

DiskLock Advertisement, PC Magazine, vol. 10, No. 11, Jun. 11, 1991; New York, New York; p. 139.

FastLock User's Manual, Version 1.0, Rupp Corp., New York, New York. No Date.

*Primary Examiner*—Brian Zimmerman
*Assistant Examiner*—William H. Wilson, Jr.
*Attorney, Agent, or Firm*—Akin, Gump, Strauss, Hauer & Feld, L.L.P.

[57] ABSTRACT

A personal computer provides security features enabling control over access to data retained in the computer. The computer is secured by having the system ROM provide a password at power-on to a security device which controls access to the secured features. Once a password has been downloaded to the security device, a Protect Resources command is issued to the security device. To gain access to the secured feature after boot-up, the user provides the correct password to the security device and waits for approval from the security device. Since the security device only verifies the password and does not divulge it, security of the system is enhanced. Once access to protected resources is no longer required, the computer issues another Protect Resources command to the security device to once more lock access to the protected resources.

12 Claims, 12 Drawing Sheets

SECURITY CONTROL FOR PERSONAL COMPUTER

This is a continuation of co-pending application Ser. No. 08/779,061 filed on Jan. 6, 1997 and abandoned Ser. No. 08/398,343, filed on Mar. 3, 1995.

BACKGROUND OF THE INVENTION

1. Field of the Invention

This invention relates to personal computer systems and, more particularly, to a personal computer having security features enabling control over access to data retained in the computer.

2. Description of the Related Art

The rapid development and adaptation of new technology in the computer industry has enabled personal computers and peripherals to become ever more powerful and sophisticated. However, the torrid pace of technological innovation has rendered many otherwise operable personal computers obsolete due to outdated system software. Particularly, if the system resident code (or firmware) is outdated, an IBM compatible computer may not be able to support features available with the latest peripherals.

Developed since the earliest generation of personal computers, the firmware residing in read only memory (ROM) provides an operational interface between a user's application program/operating system and the device to relieve the user of the concern about specific characteristics of hardware devices. This insulation layer of code eventually evolved into a Basic Input/Output System (BIOS) code which allowed new devices to be added to the system while isolating the application program from the peculiarities of the hardware. Since the BIOS is an integral part of the system and controls the movement of data in and out of the system processor, it resides on the system ROM. As new models of the personal computer family are introduced, the BIOS had to be updated and expanded to include new hardware and I/O devices.

Since the technology is rapidly changing and new I/O devices are being added to the personal computer systems, modification to the BIOS and other system software is desirable to keep existing personal computers up to date to support the latest peripherals while maintaining compatibility with existing peripherals. The availability of flash ROMs has made possible the ability to update the contents of the ROM without ever physically removing the ROM. However, since the BIOS is an integral part of the operating system, a corrupt BIOS could lead to devastating results and in many cases to complete failure and non-operation of the system.

The user's awareness of accidental or intentional misuse or otherwise unauthorized modifications to the computer's system software has been made more acute following the publicity on the adverse consequences of computer security breaches. Thus, security conscious users are requesting that security and integrity features be incorporated into their personal computers to protect the flash ROM and to prevent unintentional or malicious erasure of the flash ROM contents.

In previous systems, a switch was used to control the updating of the flash ROM. However, the switch method was burdensome and inflexible. A password approach is desirable due to lower cost of eliminating a switch, increased flexibility because passwords can be easily changed, and enhanced user convenience while still providing the necessary level of security. But at the same time, the password approach must be sufficiently secure so that the password cannot be obtained during the process. Thus, a security device is needed that can verify a password provided by the user instead of requiring the user to throw a switch to update the flash ROM and to perform such verification in a secure manner.

SUMMARY OF THE INVENTION

A computer according to the present invention provides security by having the system ROM provide a password at power-on to a security device which controls access to the secured features. Once a password has been downloaded to the security device, a Protect Resources command is issued to the security device which controls access to the protected resources such as the flash ROM. To access the secured resource, the user provides the correct password to the security device. The security device can only verify and not divulge the password, so security of the system is enhanced.

These and other features of the present invention will be understood upon reading of the following description along with the drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Prior to discussing FIGS. 2–15 which detail the security management system in accordance with the present invention, a general background summary of the operation of the personal computer protected by the security management system of the present invention merits review.

Figure 1:
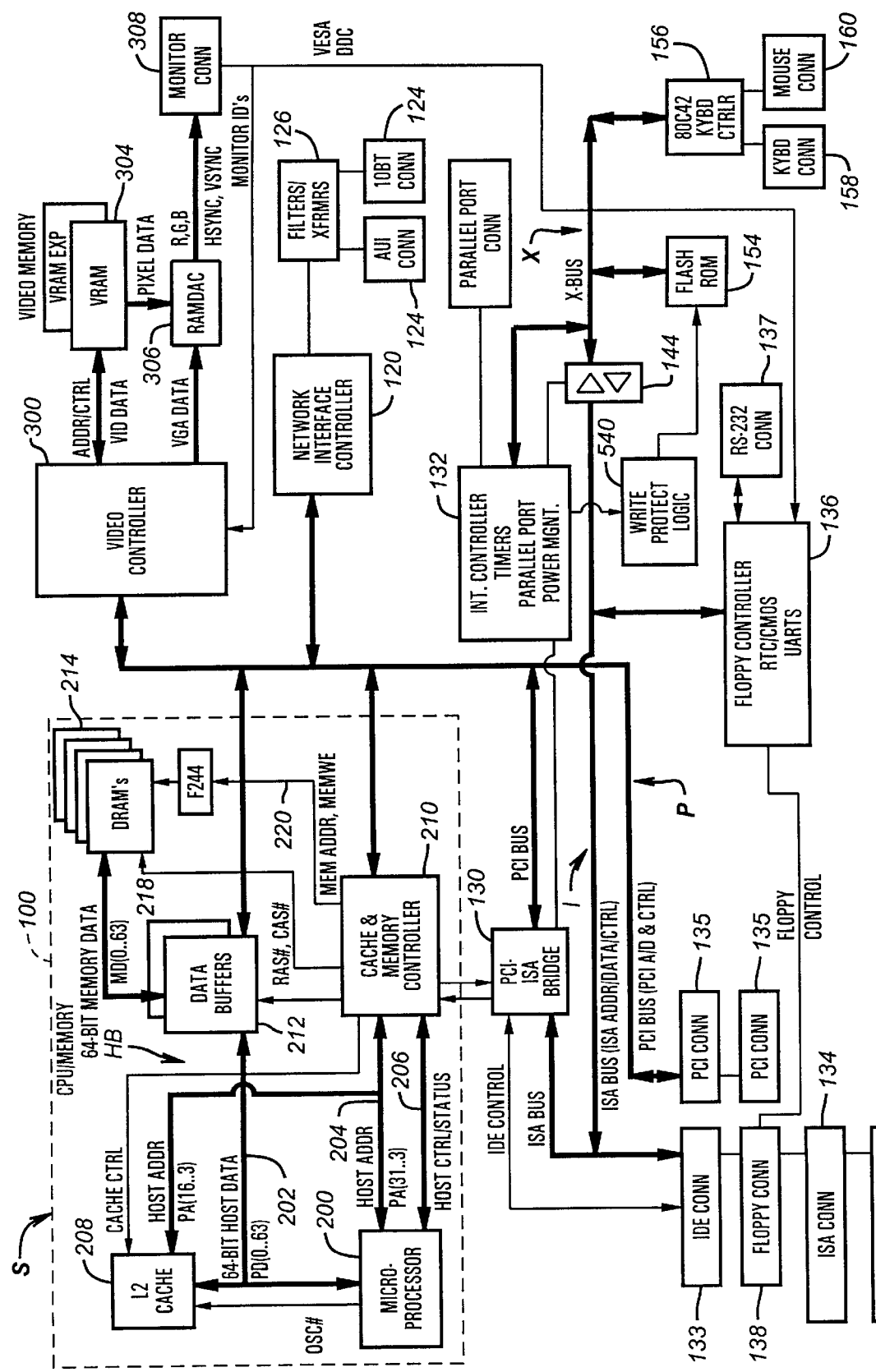
FIG. 1 is a block diagram of a computer system according to the present invention.

Referring now to FIG. 1, a computer system S according to the present invention is shown. In the preferred embodiment, there are two primary buses located in the system S. The first bus is the PCI or Peripheral Component Interconnect bus P which includes an address/data portion and control signal portion. The second primary bus in the system S is the ISA bus I. The ISA bus I includes an address portion, a data portion 110, and a control signal portion 112. The PCI and ISA buses P and I form the backbones of the system S.

A CPU/memory subsystem 100 is connected to the PCI bus P. The processor 200 is preferably the Pentium processor from Intel, preferably operating externally at 50 or 60 MHz, but could be an 80486 from Intel or processors compatible with the 80486 or Pentium or other processors if desired. The processor 200 provides data, address, and control portions 202, 204, 206 to form a host bus HB. A level 2 (L2) or external cache memory system 208 is connected to the host bus HB to provide additional caching capabilities to improve performance of the computer system. The L2 cache 208 may be permanently installed or may be removable if desired. A cache and memory controller and PCI bridge chip 210, such as the 82434X chip from Intel Corporation or the chip described in patent applications Ser. Nos. 08/324,016, entitled "SINGLE BANK, MULTIPLE WAY CACHE MEMORY" pending and 08/324,246, entitled "SYSTEM HAVING A PLURALITY OF POSTING QUEUES ASSOCIATED WITH DIFFERENT TYPES OF WRITE OPERATIONS FOR SELECTIVELY CHECKING ONE QUEUE BASED UPON TYPE OR READ OPERATION", filed Oct. 14, 1994, now U.S. Pat. No. 5,634,073, and hereby incorporated by reference, is connected to the control portion 206 and to the address portion 204. The bridge chip 210 is connected to the L2 cache 208 as it incorporates the cache controller and therefore controls the operation of the cache memory devices in the L2 cache 208. The bridge chip 210 is also connected to control a series of data buffers 212. The data buffers 212 are preferably similar to the 82433LX from Intel, or those described in patent applications Ser. Nos. 08/324,246 now U.S. Pat. 5,634,073 as incorporated above and 08/323,263 entitled "DATA ERROR DETECTION AND CORRECTION SYSTEM", filed Oct. 14, 1994, now U.S. Pat. No. 5,555,250 and hereby incorporated by reference, and are utilized to handle memory data to a main memory array 214. The data buffers 212 are connected to the processor data portion 202 and receive control signals from the bridge chip 210. The data buffers 212 are also connected to the PCI bus P for data transfer over that bus. The data buffers 212 provide a memory data bus 218 to the memory array 214, while a memory address and memory control signal bus 220 is provided from the bridge chip 210.

A video controller 300 is connected to the PCI bus P. Video memory 304 is used to store the graphics data and is connected to the video graphics controller 300 and a digital/analog converter (RAMDAC) 306. The video graphics controller 300 controls the operation of the video memory 304, allowing data to be written and retrieved as required. A video connector 308 is connected to the RAMDAC 306. A monitor (not shown) is connected to the video connector 308.

A network interface controller (NIC) 120 is connected to the PCI bus P. Preferably the controller 120 is a single integrated circuit and includes the capabilities necessary to act as a PCI bus master and slave and the circuitry to act as an Ethernet interface. Alternate Ethernet connectors 124 are provided on the system S and are connected to filter and transformer circuitry 126, which in turn is connected to the controller 120. This forms a network or Ethernet connection for connecting the computer system S to a local area network (LAN).

A PCI-ISA bridge 130 is provided to convert signals between the PCI bus P and the ISA bus I. The PCI-ISA bridge 130 includes the necessary address and data buffers and latches, arbitration and bus master control logic for the PCI bus, ISA arbitration circuitry, an ISA bus controller as conventionally used in ISA systems, an IDE (integrated drive electronics) interface, and a DMA controller. Preferably the PCI-ISA bridge 130 is a single integrated circuit, but other combinations are possible. A series of ISA slots 134 are connected to the ISA bus I to receive ISA adapter cards. A series of IDE slots 133 are connected to the ISA bus I and the PCI-ISA bridge chip 130 to receive various IDE devices, such as hard disk drives, tape drives and CD-ROM drives. A series of PCI slots 135 are connected to the PCI bus P to receive PCI adapter cards.

A combination I/O chip 136 is connected to the ISA bus I. The combination I/O chip 136 preferably includes a floppy disk controller, real time clock (RTC), CMOS memory, two UARTs, various address decode logic and security logic to control access to the CMOS memory and the power on password values. A floppy disk connector 138 for receiving a cable to a floppy disk drive is connected to the combination I/O chip 136 and the ISA bus I. Serial port connectors 137 are also connected to the combination I/O chip 136. A buffer 144 is connected to the ISA bus I to provide an additional X bus X for various additional components of the computer system. A flash ROM 154 receives its control, address and data signals from the X bus X. Preferably the flash ROM 154 contains the BIOS information for the computer system and can be reprogrammed to allow for revisions of the BIOS. An 8042 or keyboard controller 156 is connected to the X bus X and ISA bus I address and control portion. The keyboard controller 156 is of conventional design and is connected in turn to a keyboard connector 158 and a mouse or pointing device connector 160.

A miscellaneous system logic chip 132 is connected to the X bus X. The miscellaneous system logic chip 132 contains counters and timers as conventionally present in personal computer systems, an interrupt controller for both the PCI and ISA buses P and I, enhanced parallel port circuitry and power management logic, as well as other miscellaneous circuitry. Additionally, the miscellaneous system logic chip 132 includes circuitry of a security management system according to the present invention and so is connected to the flash ROM 154 through write protection logic 540.

This is an exemplary computer system S and other variations could readily be developed by one skilled in the art.

Figure 2:
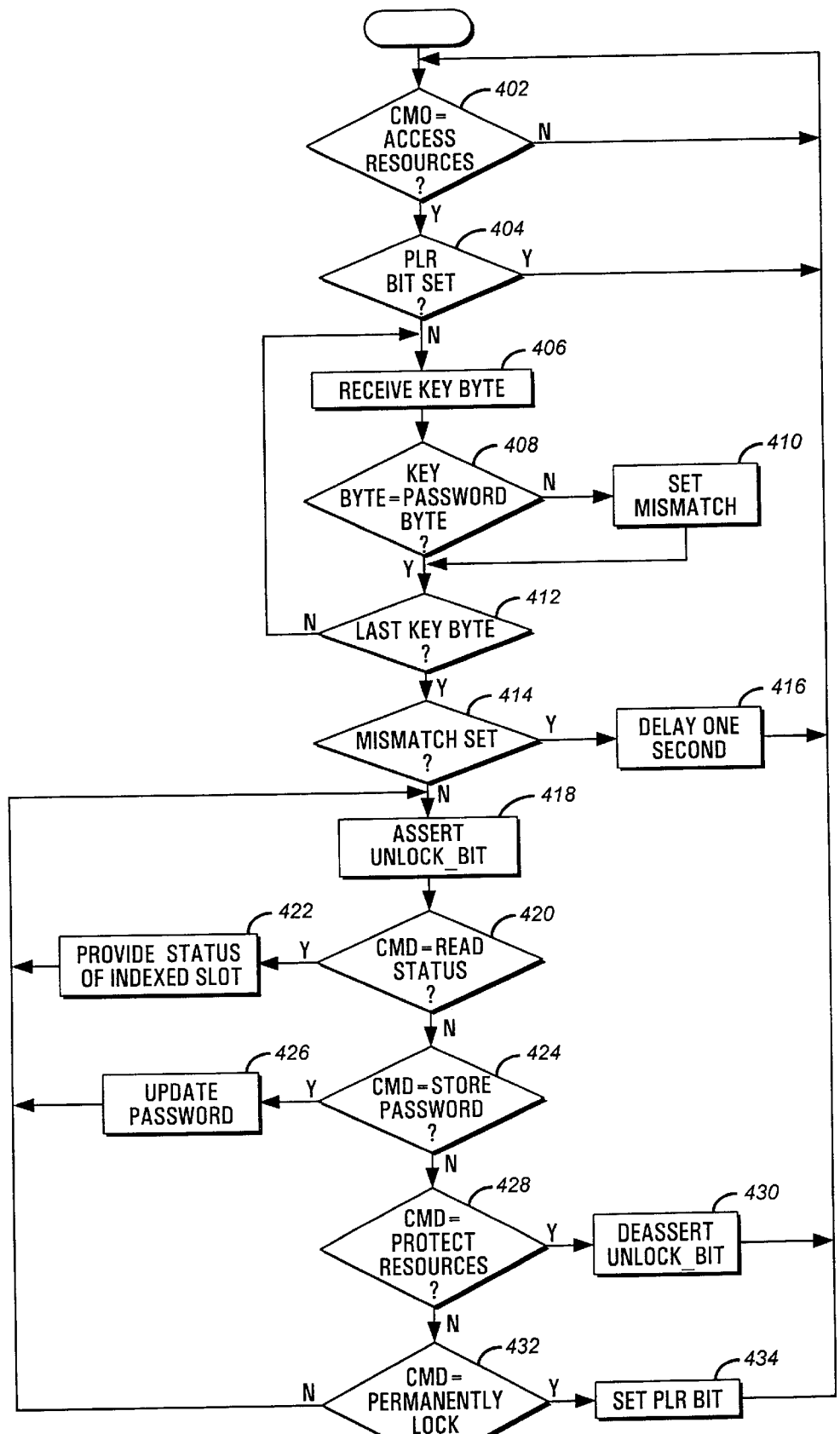
FIG. 2 is flow diagram of the security management system in accordance with the present invention.

Turning to FIG. 2, the operation of the security device is provided in greater detail as a flowchart. The preferred embodiment of the security device comprises the following elements: a command register and decoder for the security device; a data/status register for communicating with the computer, an eight byte register file to store password for each of the protected resources, and password verification logic.

Commands are preferably issued from the computer to the security device at a predetermined address. Status may be read from the last resource, or slot, indexed. The security device is capable of protecting a plurality of resources or slots. In the preferred embodiment shown in detail, only a single resource is protected, but at various locations reference is explicitly made to the plurality of resources or slots and those skilled in the art can readily determine appropriate modifications where not specifically discussed. A Read Status command is configured so that the status register of any particular resource, or slot, can be read, without affecting other operations occurring to a resource or slot, such as unlocking or changing a password. Access to a specific resource, or slot, in the security device is performed with an indexed address scheme. Two addresses are used for the indexing scheme, one address is for commands, while the second address is the data/status register. The second address acts as a data register for a write cycle and as a status register during a read cycle. The index is placed in the upper three bits of the command register.

The format of the command register of the preferred embodiment is as follows:

| Bit(s) | Read or Write | Name | Description |
|---|---|---|---|
| 7–5 | R/W | IDX[2:0] | Slot index which point to a particular resource, or slot |
| 4 | R/W | Reserved | Reserved bit |
| 3–0 | R/W | CMD[3:0] | Command bits executed by security device |

The slot index, or resource index, encoding for the preferred embodiment is as follows:

| Slot Index Encoding | | | |
|---|---|---|---|
| Index Bits | | | Slot |
| IDX2 | IDX1 | IDX0 | Number |
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

As can be seen, the preferred embodiment allows up to eight slots, or resources, to be controlled by the security device. Bits 0–3 of the preferred embodiment contain the command sent to the security device which is encoded as follows:

| Commands | | |
|---|---|---|
| Black Box Command | Command Code | Command Description |
| Read Status | X0H | Changes index pointer to the slots so that a status read can occur from another slot. |
| Store a Password | X1H | Receives the next eight bytes written to the data/status port and updates as the new password. |
| Protect Resources | X2H | Enables guarding by the security device after storing a password or after access to a secured resource is completed. |
| Access Resources | X4H | Once this command is given, the next eight bytes written to the data/status port are compared against the stored password. If the compare is good, the security device will unlock the resource and allow changes. A Protect Resources command must be given when done |

-continued

| Commands | | |
|---|---|---|
| Black Box Command | Command Code | Command Description |
| | | making changes so that the resource is once again protected. |
| Permanently Lock Resources | X8H | Permantently lock all resources. Future accesses to protected system resources are not possible unless power is cycled. A status register read is possible. |

In addition to sending commands to the security device, status can be read from the security device at any time, by reading the status/data register, preferably located at a second predetermined address adjacent to the first predetermined address. The data/status register serves two purposes. When serving as the data register, the register is used when storing passwords or verifying passwords (accessing resources).

To store passwords, the Store Password command must first be sent to the security device. Then, the next eight writes to the data/status register cause the data written to the data/status register to be stored as the password for the security device. Eight bytes are preferably written to the data/status register in the preferred embodiment, although the actual size of the data/status register may be smaller or greater. If another command for the security device arrives before all eight bytes have been stored for the password, the password storage operation for that slot in the security device aborts and the password then contains undefined data.

The status register provides status information on a particular resource when read. The status register is defined below.

| Commands | | | |
|---|---|---|---|
| BITS | READ OR WRITE | NAME | DESCRIPTION |
| 7–5 | R | IDX[2:0] | Slot index bits |
| 4–3 | R | Reserved | Reserved bits |
| 2 | R | PL | Permanently Locked |
| 1 | R | D | Delay in progress if set due to mismatch |
| 0 | R | U | UNLOCK_Pin state |

Bits 7–5 provide an indication of which particular resource or slot the remaining bits identify. The PL bit indicates when set that this resource is permanently locked. The D bit indicates when set that a one second delay is in progress due to a password mismatch. The U bit is the state of the UNLOCK_ pin or signal for the resource.

For overview purposes, the simplified operation of the security device after initialization is next discussed. To verify a password, first an Access Resources command must be sent to the security device. Then, the next eight writes to the data/status register cause the byte written to the data/status register to be compared against a byte of the password stored in the security device. If correct password is provided, the resource is unlocked, otherwise the security device is unavailable for one second before the next command can be sent.

Turning to FIG. 2, the general process of unlocking a slot after initialization is shown. In step 402 a determination is made if an Access Resources command is received by the security device. Until an Access Resource command is received, the operation essentially loops at step 402. The resources have to have been protected by the Protect Resources command during initialization as described below in order for the Access Resources command to be recognized. Then in step 404, a determination is made if a permanent lock resources (PLR) bit has been set to check the condition that a permanently lock resources command has been issued. If so, the Access Resources command is ignored. Once the Access Resources command has been received and the resource or slot is not permanently locked, the security device receive a byte representative of a key or password written to the data/status port at step 406. The byte is compared against the appropriate byte in the password stored in the register file in the security device at step 408. Bytes written to the data/status register are received in the same order as received in the Store Password command. After a byte is received, a compare between the received key byte and the corresponding byte in the password register file is performed. If the key byte fails to match the password byte, a MISMATCH bit is set at step 410. The comparison sequence is repeated at step 412 until the last byte, or the eighth byte in the preferred embodiment, has been checked. The status register is not updated until all eight bytes have been received.

In the preferred embodiment, eight compares must occur before the result of the verification is checked. If a command is written to the command register when the security device is expecting to receive bytes to compare against the stored password, the password verification phase is aborted and the command that was received by the security device is ignored.

In step 414 after the last byte has been received, if the mismatch flag is set, control proceeds to step 416 where the unlock output is kept inactive and a one-second delay occurs before another attempt to access the security device can occur.

Once the Access Resources command has been validated, the security unit responds to the commands given to it. Further, the security unit asserts the UNLOCK_ bit signal low or active in step 418. The UNLOCK_ signal is used to signal that the access to the secured resources has been granted and is used to enable the secured resources.

If the command is a Read Status command in step 420, then in step 422 the security unit enables the status register of the indexed slot to return the status of that slot back to the computer.

In step 424, if the command is a Store Password command, the next eight bytes written to the data/status port are to be stored as the new password and this is done in step 426.

In step 428, if the command is a Protect Resources command, the security feature is restarted such that a new password verification is required. The UNLOCK_ output is deasserted or set high after receiving this command in step 430. Once this command is given, the only way to change security device protected resources is to reissue an Access Resources command and reprovide the password. In step 432, if the user issues a Permanently Lock resources command, the PLR bit is set in step 434. If this command is written to the security device, the resources are permanently locked. Security device access to protected system resources is no longer possible unless power is cycled. However, a status register read is still possible.

For simplicity, while this description focuses on protecting only one resource, it is within the scope of the invention to have multiple resources located in multiple slots for passwords in the security device. This is done by the use of the different index values, each referencing a different resource or slot. In this description, the index value is always assumed to be zero to access the first slot. Thus, in a multiple resource embodiment, there are a plurality of eight byte password registers used to store passwords. In the multiple resource embodiment, the security device has an UNLOCK_ output for each slot. The additional slots in the security device can include slots for power-on password, administrator password, Safe Start hash codes, among others. The power-on password slot controls the power-on password, which is currently only changeable at boot time. If a slot is provided then the power-on password can be changed at run-time. In addition to the power-on password slot, another slot may be used to address the rest of the protected areas that are accessible through the Administrator password. Further, Safe Start codes resource is another candidate.

The Safe Start hash codes are used to verify the integrity of computer data for effects of computer viruses. The Safe Start system provides verification independent of and transparent to the operating system because it uses a reserved non-DOS hard disk partition system to check on the DOS partition of the computer. This system is disclosed in U.S. patent application Ser. No. 08/315,702 entitled "TRANSPARENT, SECURE COMPUTER VIRUS DETECTION METHOD AND APPARATUS" now U.S. Pat. No. 5,537,540 and in U.S. application Ser. No. 08/231,443 entitled "METHOD AND APPARATUS FOR ASSESSING INTEGRITY OF COMPUTER SOFTWARE", now U.S. Pat. No. 5,421,006 both of which are hereby incorporated by reference. The Safe Start hash codes could also be protected by a slot in the security device. Since these hash codes are never visible to the user, this section may permanently locked by the security device.

Figure 3:
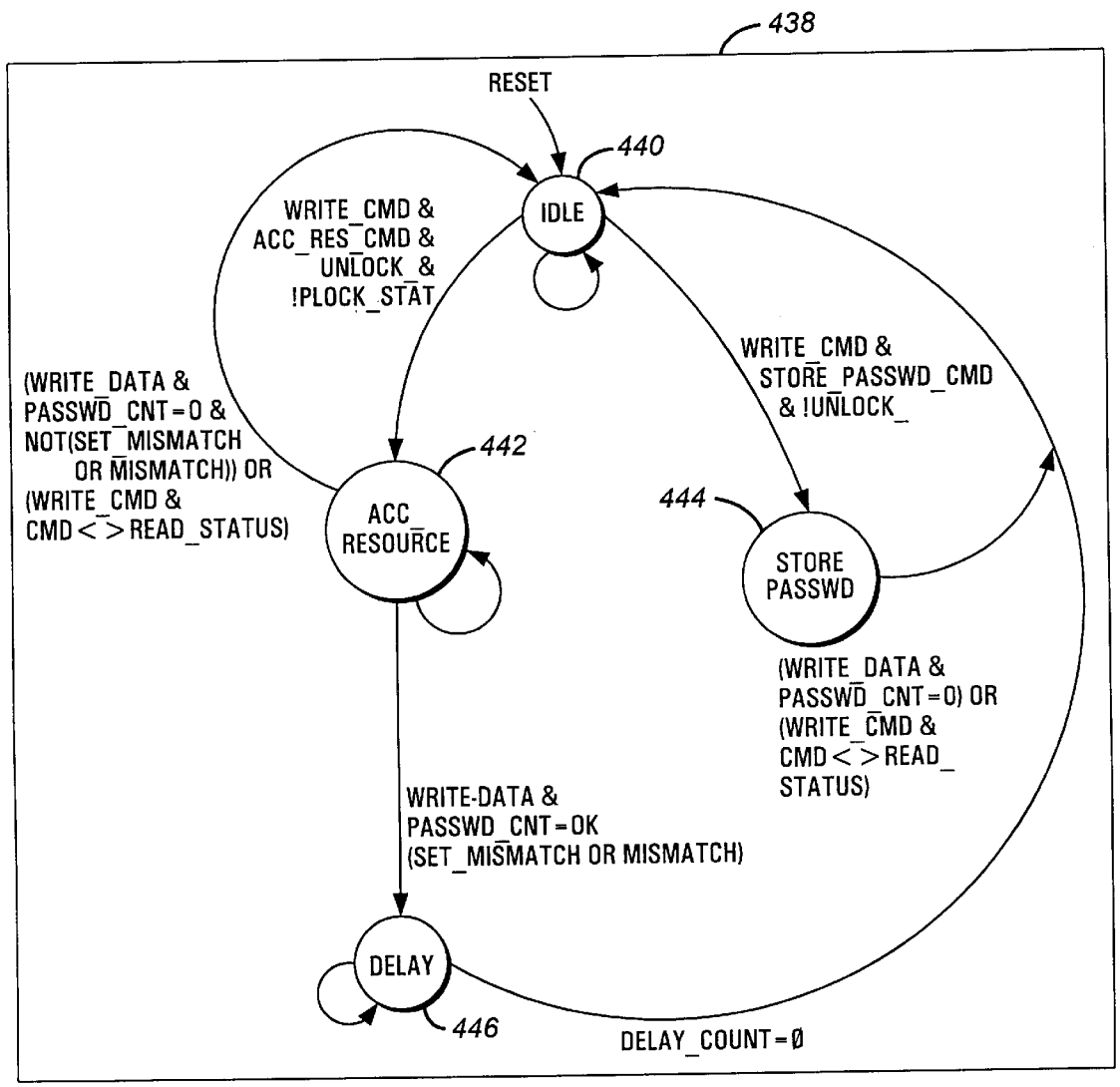
FIG. 3 is a state machine of the security management system used in implementing the flow diagram of FIG. 2.
Figure 4:
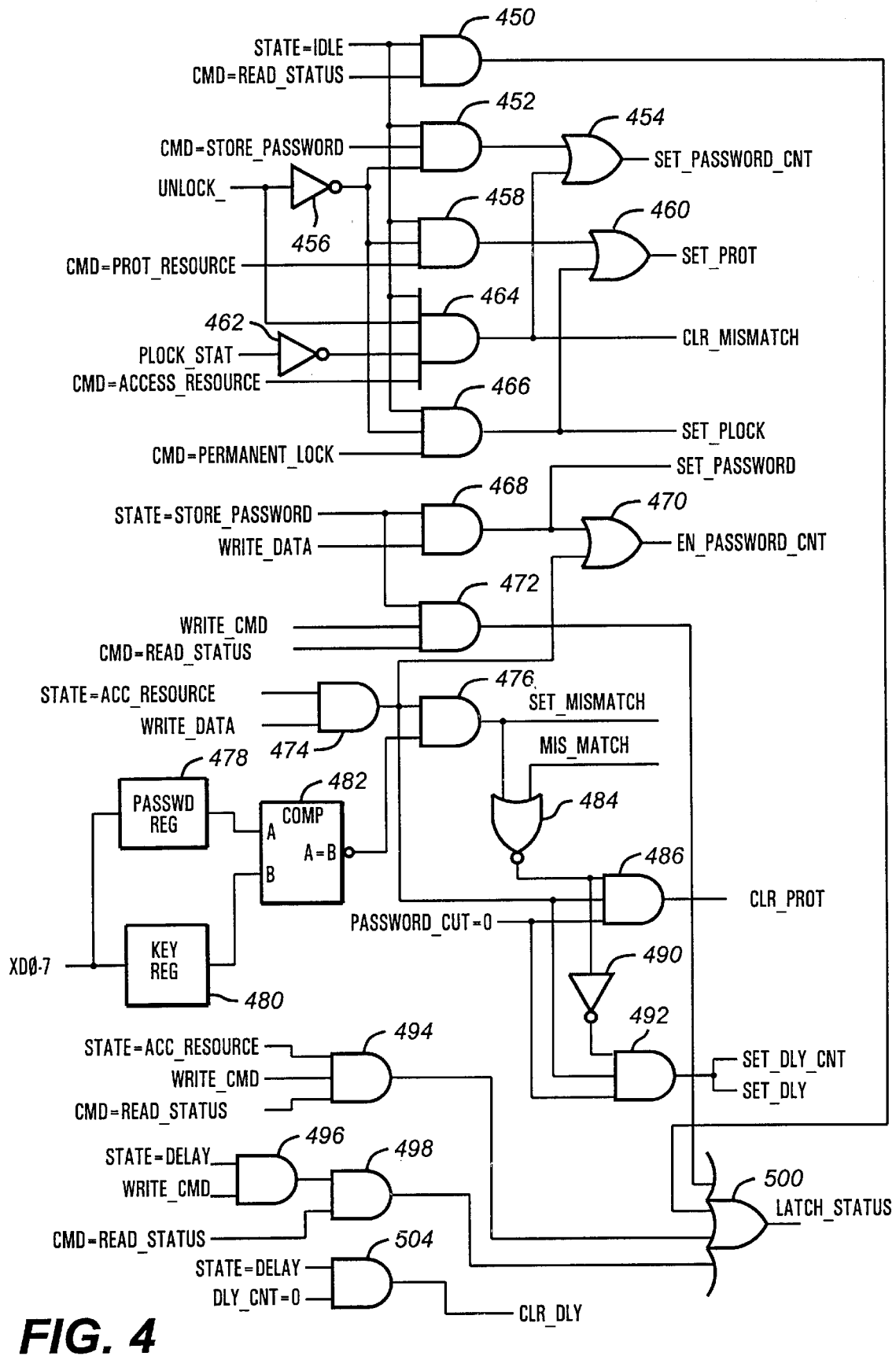
FIGS. 4, 5 and 6 are schematic diagrams of portions of the security management system associated with the state machine of FIG. 4.

Turning to FIG. 3, a state machine 438 controlling the security device according to the invention is disclosed. The states of the machine are sequenced on the falling edge of a write instruction to the command register. As shown in FIG. 4, the state machine has an IDLE state 440, an ACC_RESOURCE state 442 in which access to a secured resource may be granted, a STORE_PASSWD state 444 in which a new password can be stored, and a DELAY state 446 for delaying responses for a period of time, preferably one second, if the key provided does not match the password.

Upon reset, the state machine 438 is in IDLE state 440. In this state, only commands are accepted. The IDLE state 440 transitions to the ACC_RESOURCE state 442 when a command is written to the command register (WRITE_COM), this command is an access resource request (ACC_RES_CMD), the locked or unlocked status signal (UNLOCK_) is deasserted or high and the lock status signal (PLOCK_STAT) is not asserted. The PLOCK_STAT signal, if not asserted, indicates that the Permanent Resources command has not been issued. Once in the ACC_RESOURCE state 442, the state machine 438 may transition back to the IDLE state 440 or to the DELAY state 446.

The transition from the ACC_RESOURCE state 442 to the IDLE state 440 occurs when data is written to the data/status register (WRITE_DATA); the password count equals zero (PASSWD_CNT=0), indicating that all eight bytes have just been written; and the SET_MISMATCH and MISMATCH signals are deasserted. The SET_MISMATCH signal is set when the current byte being written is a mismatch, while the MISMATCH signal indicates that a byte previously written on this attempt mismatched. The transition from the ACC_RESOURCE state 442 to the IDLE state 440 also occurs when a command other than a Read Status command is written to the command register. The transition from the ACC_RESOURCE state 442 to the DELAY state 446 occurs when data is written to the data/status register (WRITE_DATA); the password count equals zero, indicating the last byte has been written; and either the SET_MISMATCH or the MISMATCH signal is asserted. This transition handles the event where the key and the password do not match. A delay of preferably one second is encountered once the DELAY state 446 is entered. This period is clocked by a count-down counter 536 (FIG. 5) whose output is DELAY_COUNT. Thus, upon DELAY_COUNT reaching zero, the DELAY state 446 transitions back to the IDLE state 440.

The IDLE state 440 can also transition to the STORE_PASSWD state 444 when a request to the command register (WRITE_COM) to update the password (STORE_PASSWD_CMD) is written and the unlocked status signal (UNLOCK_) is asserted or low. The STORE_PASSWD state 444 transitions back to the IDLE state 440 when the data is written to the data register (WRITE_DATA) and the password count equals zero (PASSWD_CNT=0), signifying that the last byte of the new password have been accepted. The STORE_PASSWD state 444 also transitions back to the IDLE state 440 when the when any command other than read status (READ_STATUS) is asserted before the new password is downloaded. Hence, if a command is sent before all password bytes are sent, the state machine 438 transitions back to the IDLE state 440 with the password being only partially updated. It should be assumed that the password contains unknown values.

Figure 5:
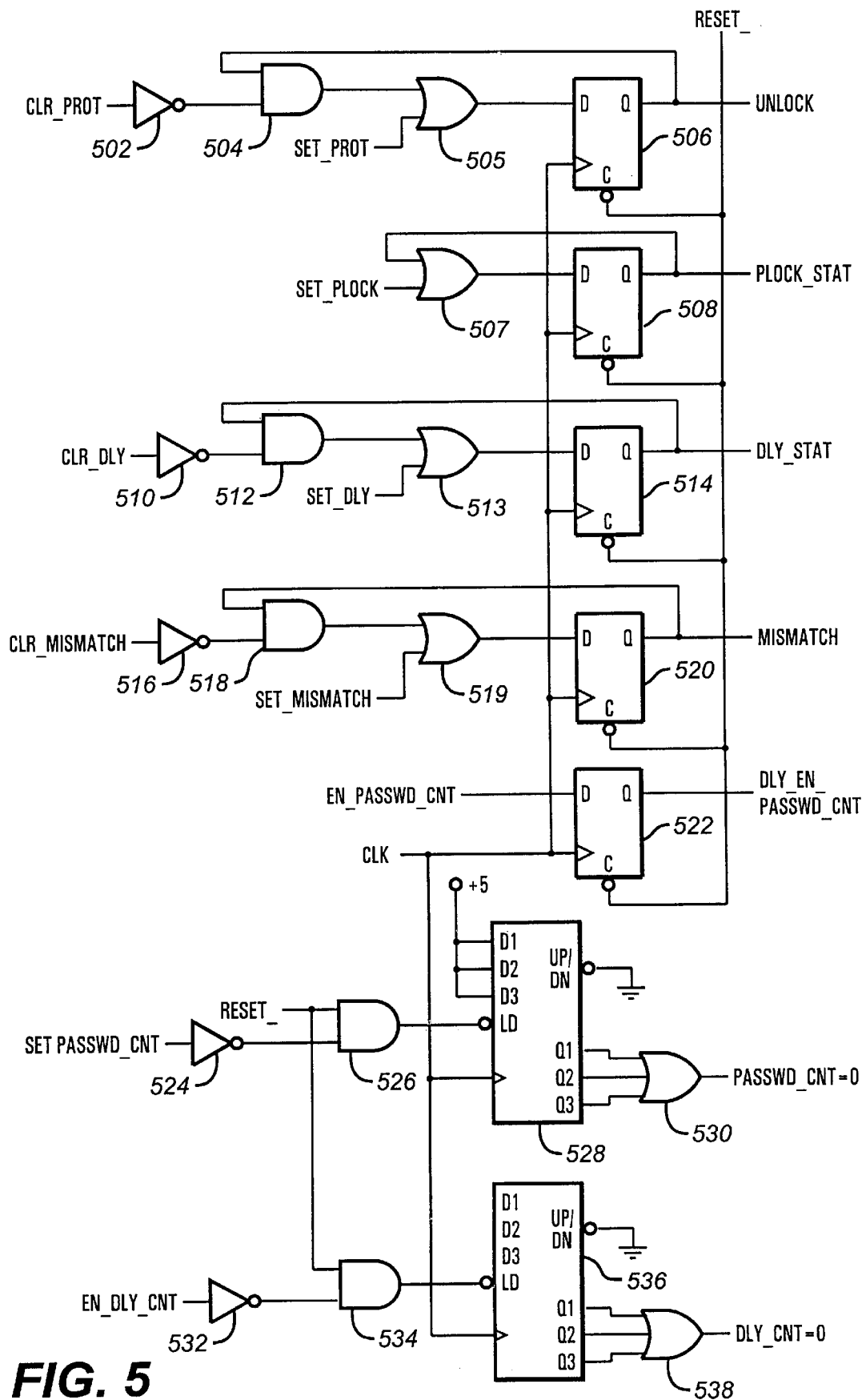
Figure 6:
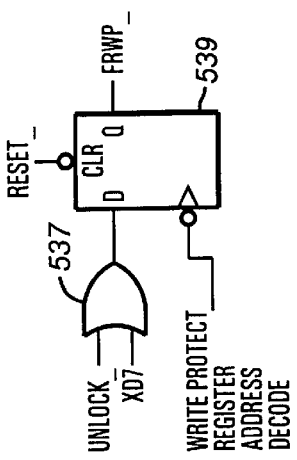

Turning to FIGS. 4, 5, and 6, the logic providing the signals to the state machine 438 is disclosed in more detail. When the state is the IDLE state 440 and a Read Status command is encountered, a LATCH STATUS signal is asserted via an AND gate 450 in conjunction with an OR gate 500. When the state is IDLE, the command is Store Password and the UNLOCK_ signal is asserted low, an AND gate 452 in conjunction with an OR gate 454 asserts the SET_PASSWD_CNT signal. The SET_PASSWD_CNT signal of the OR gate 454 is also asserted by an AND gate 464 when the state is IDLE, the UNLOCK_ signal is deasserted or high, the lock status bit (PLOCK_STAT) is false, and the command is Access Resource. The output from the AND gate 464 is also the clear mismatch (CLR_MISMATCH) signal.

In IDLE state 440, when the command is Protect Resource (PROT_RESOURCE) and the UNLOCK_ signal is asserted, the SET_PROT signal is asserted via an AND gate 458 in conjunction with an OR gate 460. The SET_PROT signal is also asserted by the OR gate 460 based on an input from an AND gate 466, which asserts its output when the state is IDLE, UNLOCK_ is asserted low, and the command is Permanent Lock (PERMANENT_LOCK). The output of the AND gate 466 is also the SET_PLOCK signal.

In the STORE PASSWD state 444, when data is written to the data register (WRITE_DATA), an AND gate 468 asserts the SET_PASSWD signal and the EN_PASSWD_CNT signal is asserted through an OR gate 470. Further, when in state STORE_PASSWD, and the Read Status command is written to the command register, the LATCH STATUS signal is asserted via an AND gate 472 and the OR gate 500.

When the state machine 438 is in state ACC_RESOURCE 442 and data is written to the data register, the EN_PASSWD_CNT signal is asserted via an AND gate 474 and the OR gate 470. Further, the output of the AND gate 474 is ANDed via AND gate 476 with the output of a comparator 482 which compares the proper byte in a password register 478 with a key register 480 to generate the SET_MISMATCH signal. The password register 478 is actually the depth of the password, eight bytes in the preferred embodiment, and the proper byte is selected based on the password counter 528 value. The key register 480 need only be a single byte register as the previous bytes of the key need not be stored. The SET_MISMATCH signal indicates a mismatch of the current byte and is latched to indicate that a mismatch has already occurred in a previous clock period. The output of the latching operation, the MISMATCH signal, is gated with the SET_MISMATCH signal using a NOR gate 484. The output of the NOR gate 484 is ANDed with the output of the AND gate 474 and the PASSWD_CNT=0 signal by an AND gate 486 to generate the CLR_PROT signal. The output of the NOR gate 484 is further inverted by an inverter 490 and then gated with the output of the AND gate 474 and the PASSWD_CNT=0 signal by an AND gate 492 to generate the delay signals SET_DLY and SET_DLY_CNT.

When the state machine 438 is in state ACC_RESOURCE 442, a command signal is written to the command register and the command is Read Status, an AND gate 494 generates the LATCH STATUS signal via the OR gate 500. The LATCH STATUS signal is also generated by AND gates 496 and 498 when the state machine is in the DELAY state 446, the write command signal (WRITE_CMD) is asserted and the command is Read Status. The clear delay signal CLR DLY is generated by ANDing the DLY_CNT=0 signal with the STATE=Delay condition in an AND gate 504.

Turning to FIG. 5, each of a series of flip-flops 506, 508, 514, 520, and 522 have a clear input which is tied to the signal for resetting the computer (RESET_) and a clock input which is tied to the clock signal CLK, which is preferably the OSC or oscillator signal from the ISA bus I but could be any suitable clock signal. As shown in FIG. 5, the clear protect signal CLR_PROT is inverted by an inverter 502 and then ANDed with the output of the flip-flop 506 by an AND gate 504 whose output is provided to an OR gate 505 which also receives the set protect signal SET_PROT and provides its output to the D input of the flip-flop 506. In this manner, the flip-flop 506 generates the UNLOCK_ signal during the next clock transition and is made active by issuing a PROTECT RESOURCES command or a PERMANENTLY LOCK RESOURCE command to the security device.

The PLOCK_STAT signal is generated by the flip-flop 508, which receives the output of an OR gate 507 at its D input and updates the PLOCK_STAT signal during the next clock CLK transition. The OR gate 507 receives the SET_PLOCK signal and the output of the flip-flop 508. The delay status signal CLR_DLY is inverted by an inverter 510 and then ANDed with the output of the flip-flop 514 via an AND gate 512 which provides its output to an OR gate 513 which also receives the SET_DLY signal and provides its output to the D input of the flip-flop 514. In this manner, the flip-flop 514 generates the DLY_STAT signal during the next clock transition. Similarly, the clear mismatch signal CLR_MISMATCH is inverted by an inverter 516 and then ANDed with the output of the flip-flop 520 via an AND gate 518 which provides its output to an OR gate 519 which also receives the SET_MISMATCH signal and provides its output to the D input of the flip-flop 520. In this manner, the flip-flop 520 generates the MISMATCH signal during the next clock transition. The EN_PASSWD_CNT signal is held by the flip-flop 522 one clock period to generate the DLY_EN_PASSWD_CNT to provide additional time for the other circuits that depend on this signal.

Two counters 528 and 536 are used to sequence the password count and the delay count, respectively. Both counters 528 and 536 have the data inputs connected to logic high, or 5V DC, and the COUNT UP/DOWN_ input wired to ground to indicate that the counters 528 and 536 are to count down. The SET_PASSWD_CNT signal is inverted by an inverter 524 and then ANDed with the RESET_ signal via an AND gate 526, which drives the inverted load or LD_ signal of the counter 528 to reload the counter 528. Similarly, the EN_DLY_CNT signal is inverted by an inverter 532 and then ANDed with the RESET_ signal via an AND gate 534 which drives the LD_ input of the counter 536. The detection that the output of each of counters 528 and 536 equals zero is performed by an OR gate. Thus, an OR gate 530 is connected to the outputs of counter 528 to generate the PASSWD_CNT=0 signal. Similarly, an OR gate 538 is connected to the outputs of counter 536 to generate the DLY_CNT=0 signal.

Turning to FIG. 6, the generation of the FRWP_ signal in the preferred embodiment is disclosed. This signal is generated in conjunction with the UNLOCK_ output of the security device, which is controlled through the states of the security device state machine as described above. In FIG. 6, the UNLOCK_ signal and bit 7 of the data portion of the X-bus are provided to OR gate 537. The output of the OR gate 537 is provided to the D input of a flip-flop 539. The CLR input of the flip-flop 539 is connected to the RESET_ signal for resetting purposes. Further, the flip-flop 539 is clocked by the falling edge of a write protect register address decode signal. A write protect register was provided in the combination I/O chip 136 and was used to enable or disable protection of the flash ROM in prior systems. The use of the bit in the register is maintained in the preferred embodiment and is supplemented by the use of the security device to allow further protection of the flash ROM. To guarantee that the flash ROM is properly protected, that register is mirrored in the miscellaneous system logic chip 132. The write protect register address decode signal indicates a write to that register. The output of the flip-flop 439 is an FRWP_ signal is used to control updating of the flash ROM. Thus to write to the flash ROM, the flash ROM resource must be unlocked using the security device and the bit in the write protect register must be set.

Figure 7:
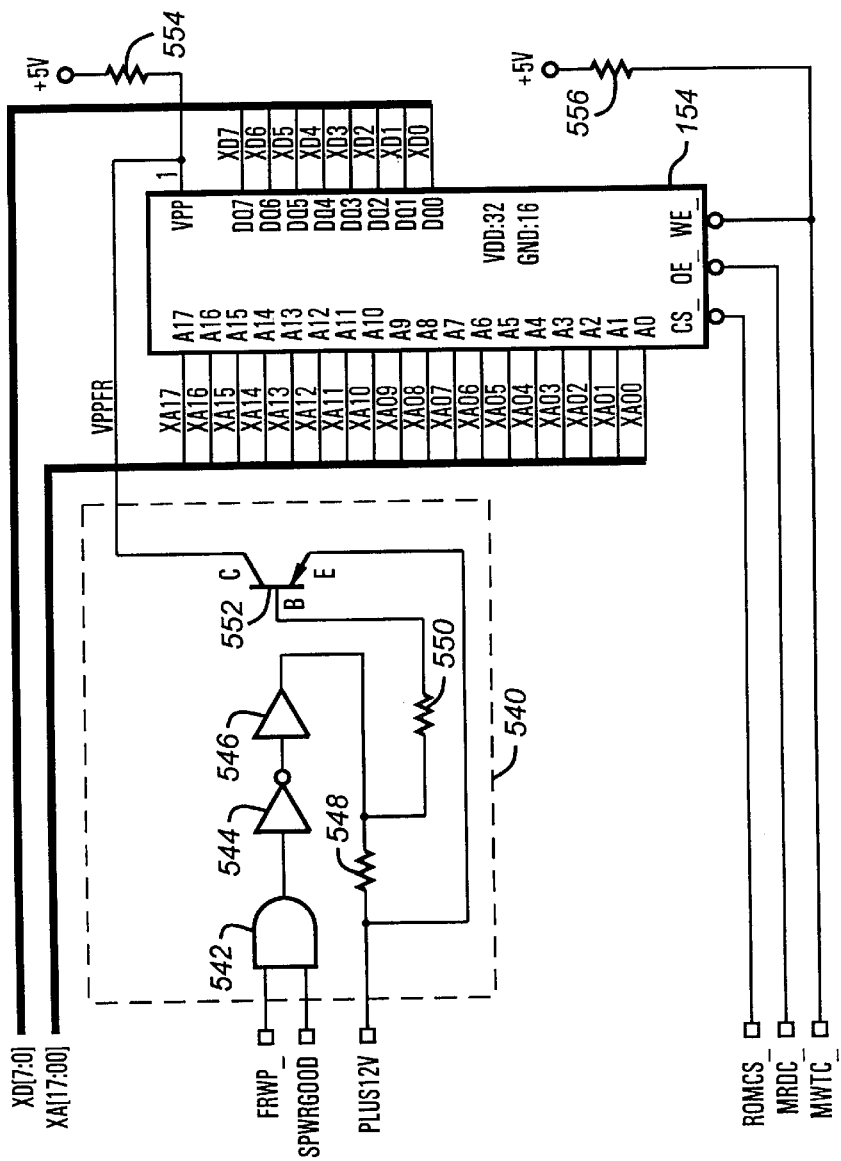
FIG. 7 is a schematic diagram of the flash ROM programming circuit.

Turning now to FIG. 7, the write protect logic 540 is disclosed. The flash ROM write protect (FRWP_ signal and a synchronized power supply good (SPWRGOOD) signal are provided to an AND gate 542, whose output is negated by an inverter 544 before passing through a buffer 546. A 12 VDC power supply is coupled to the output of the buffer 546 via a resistor 548. The output of the buffer 546 is also provided to a resistor 550, which is connected to the base of a PNP transistor 552. The emitter of the transistor 552 is connected to the 12 VDC power supply, while the collector of the transistor 552 is connected to the programming voltage terminal of the flash ROM 154. The programming voltage terminal of the flash ROM 154 is also pulled-up to logic high through a resistor 554. A pull-up resistor 556 is further provided to the write enable input of device 154.

In addition to the connection from the write protection logic 540, the flash ROM 164 has address inputs which are coupled to the address portion of the X bus X, data signals which are coupled to the data portion of the X bus X, and conventional chip select, output enable, and write enable inputs that are driven by circuitry on the computer system S when the flash ROM 164 is addressed. Once the FRWP_ signal is true, the flash ROM 164 can be written in a manner similar to a random access memory (RAM). Thus, the updating of the flash ROM 164 can be accomplished in a secure manner.

Figure 8:
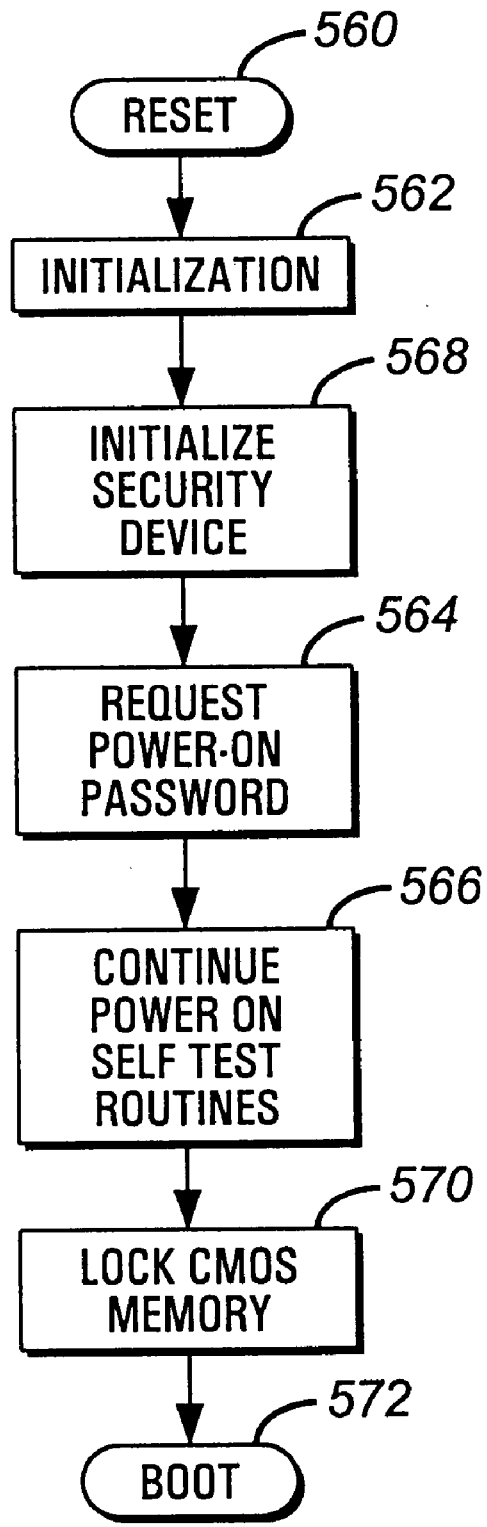
FIG. 8 is a flow chart of the boot-up process of the computer of FIG. 1.

Turning to FIG. 8, a very simplified flow chart of the boot-up process of the computer is disclosed. As shown in FIG. 8, after the computer system S is reset in step 560, the computer system S is initialized in step 562. After this initialization and beginning of certain self test operations. In step 568, the security device is initialized. Next, at step 564, the computer system S requests a power-on password, if enabled, and then continues execution of the power-on-self-test routines at step 566. After that, the CMOS memory is locked in step 570 so that any contained passwords, such as the power-on and administrator passwords, and any SafeStart hash codes are secured and cannot be read. This locking of the CMOS memory is conventional and the computer begins the boot-up process in step 572. An example of how the CMOS memory can be locked is provided in Ser. No. 08/315,702, referenced above, but further information can be obtained in data sheets and information relating to CMOS memory circuits adapted for this personal computer use.

Figure 9:
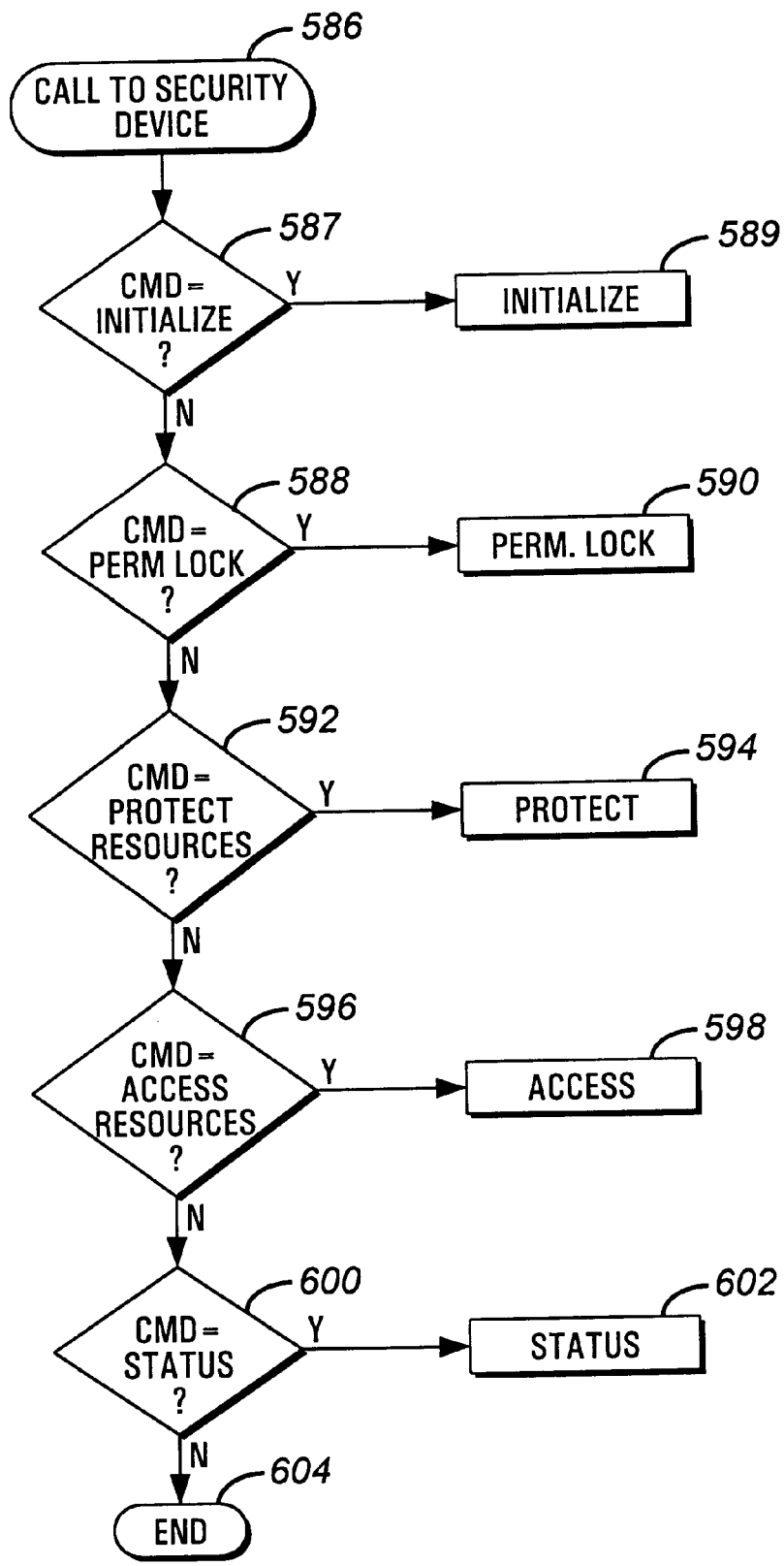
FIG. 9 is a flow chart of the BIOS software handler for the security management system in accordance with the invention.

FIG. 9 is a flow chart of the BIOS software handler for the security management system in accordance with the invention. It is noted that in this description all of the index values in the commands are set to zero as only a single slot is present on the preferred embodiment. The index value would be properly set based on the resource to be referenced if several resources were being secured. The execution of the software begins when a system call is made to the security device handler in step 586. The command is then parsed in steps 587–600. In step 587, if the command is Initialize, as provided in step 568, the Initialize routine is executed at step 589. Otherwise, in step 588, if the command is Permanent Lock, the Perm Lock routine is executed at step 590. Otherwise, in step 592, if the command is Protect Resources, the Protect routine is executed at step 594. Otherwise, in step 596, if the command is Access Resources, the Access routine is executed at step 598. Otherwise, in step 600, if the command is Read Status, the Status routine is executed at step 602. Otherwise, the software exits at step 604.

Figure 10:
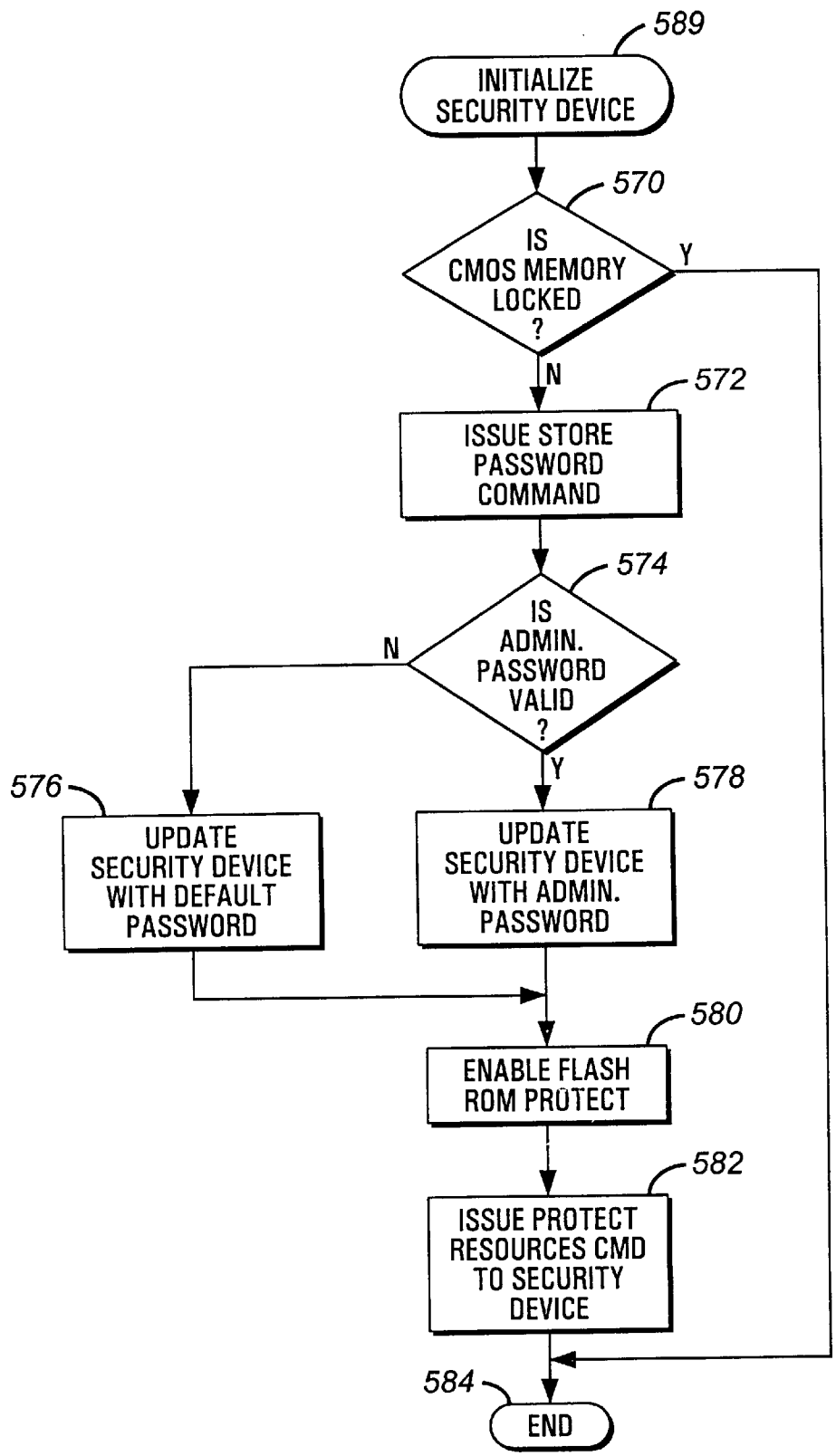
FIG. 10 is a flow chart of BIOS initialization of the security management system in accordance with the invention.

Turning to FIG. 10, the flow chart of BIOS initialization routine of the security management system in accordance with the invention is disclosed. As noted in FIG. 9, the operation is entered during the power up procedures when the BIOS handler is called with an INITIALIZATION command value. In this initialization process, the computer system S checks to determine if the CMOS memory is locked at step 570. If so, the administrator password cannot be read, so the password cannot be obtained to be stored. Control is transferred to step 584 to exit.

If the CMOS memory is not locked, the computer system S issues a Store Password command to the security device in step 572. It then checks to determine if the administrative password is valid in step 574. If not, the security device is updated with a default password at step 576, otherwise the security device is updated with the administrative password at step 578. Next, the computer system S enables the flash ROM protect bit in the write protect register at step 580 to prevent inadvertent programming to the flash ROM 164. The Protect Resources command is then issued to enable security protection in step 582. The software then exits in step 584.

Figure 11:
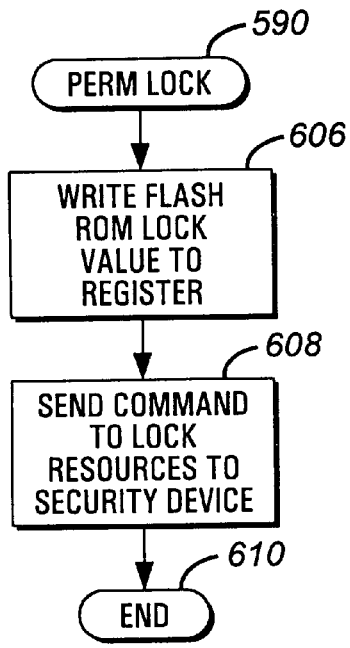
FIG. 11 is a flow chart of the BIOS software handler for the permanent lock command of FIG. 10.

FIG. 11 is a flow chart of the BIOS software routine for the Permanent Lock command, which begins at step 590. In step 606, the computer system S writes the flash ROM lock value to the write protect register. The computer system S then sends the Permanent Lock command to the security device in step 608 before exiting in step 610.

Figure 12:
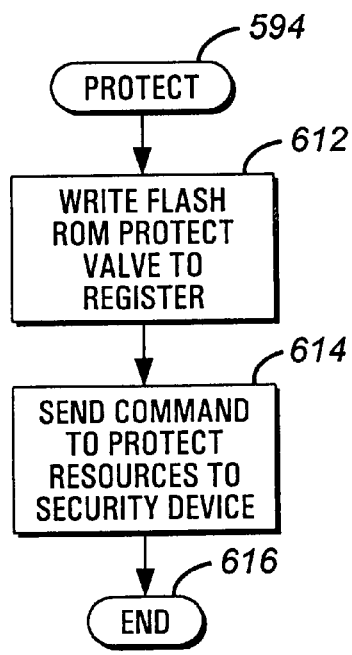
FIG. 12 is a flow chart of the BIOS software handler for the protect resources command of FIG. 10.

FIG. 12 is a flow chart of the BIOS software routine for the Protect Resources command, which begins at step 594. In step 612, the computer system S writes the flash ROM protect value to write protect register. The computer system S then sends the Protect Resources command to the security device in step 614 before exiting in step 616.

Figure 13:
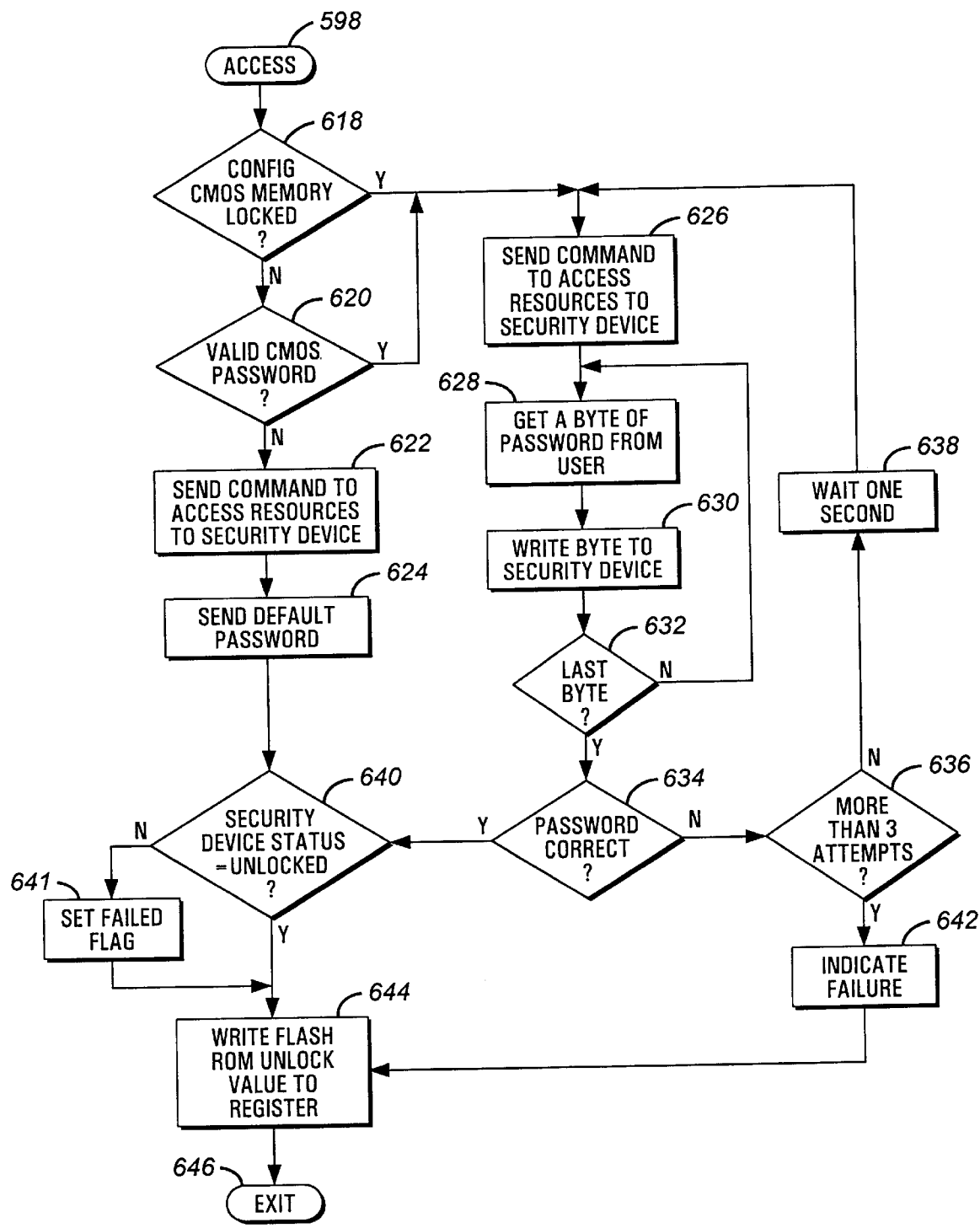
FIG. 13 is a flow chart of the BIOS software handler for the access resources command of FIG. 10.

FIG. 13 is a flow chart of the BIOS software routine for the Access Resources command, which begins at step 598. The computer system S initially checks to see if the CMOS memory is locked in step 618. If not, the validity of the administrator password is tested in step 620. If the password is not valid, the computer system S uses the Default Password. In this process, the computer system S then sends the Access Resources command to the security device in step 622 and then sends the Default Password to the security device in step 624.

In the event that the CMOS memory is locked in step 618, or that the CMOS memory is not locked, but a valid administrator password exists in step 620, the computer system S sends an Access Resources command to the security device in step 626. It then gets a byte of password from the user in step 628 and writes the byte to the data/status register of the security device at step 630. Then in step 632 the computer system S determines if the last byte has been received. If not, control returns to step 628. Thus, the next eight writes to the data/status register cause each byte written to the data/status register to be compared against a byte of the password stored in the security device. If the last byte is encountered in step 632, the software then verifies that the password was correct and accepted by examining the D or delay bit from the security device in step 634. If the password is rejected by the security device as indicated by the D bit being set, the software checks to see if less than three passwords were attempted in step 636. If not, the software delays one second in step 638 by waiting for the D bit to clear before restarting the sequence once more by branching to step 626. If more than three passwords have been attempted in step 636, failure is indicated to the user in step 642 and the sequence is exited in step 646.

If the password was correct in step 634, or if the default password was sent in step 624, the software branches to step 640, where the computer system S checks on the unlocked status of the security device. If the device is still locked, a failure flag is set in step 641 to indicate failure in accessing the security device. If the security device is unlocked in step 640 or after setting the failure flag in step 641, the software writes the flash ROM unlock value to the write protect register in step 644 before exiting in step 646.

Figure 14:
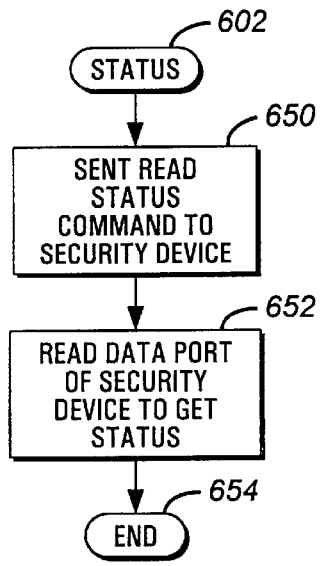
FIG. 14 is a flow chart of the BIOS software handler for the read status command of FIG. 10.

Turning to FIG. 14, a flow chart of the BIOS software routine for the Read Status command is disclosed. The routine is entered in step 602. The software then sends the Read Status command to the security device in step 650. The computer system S then reads the data port of the security device to get the status in step 652 before exiting in step 654.

Figure 15:
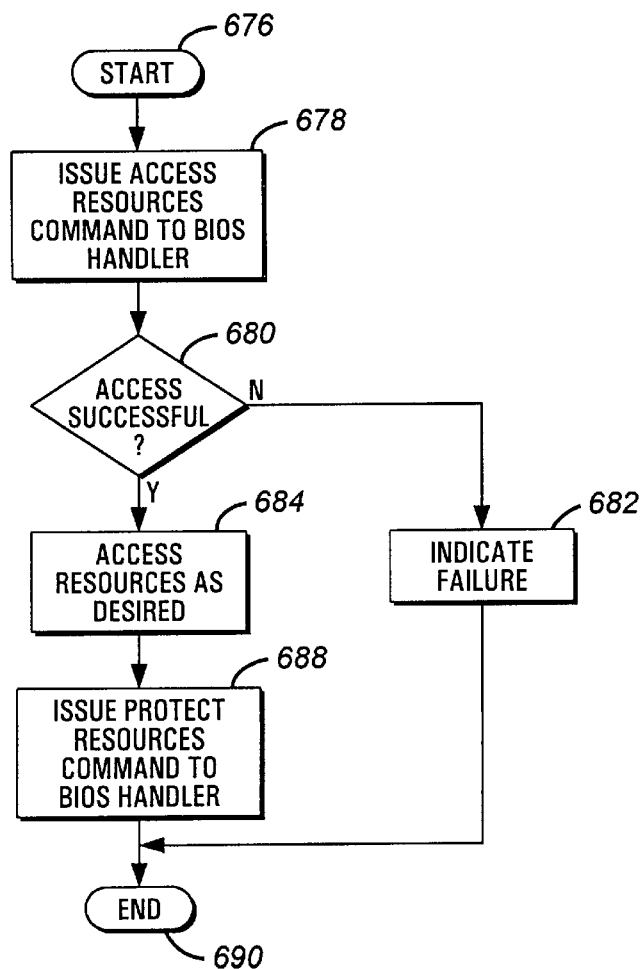
FIG. 15 is an illustrative flow chart of the software for issuing commands in general to the security management system in accordance with the invention.

Turning to FIG. 15, an illustrative sequence for accessing secured resources is shown. This sequence would be followed, for example, when a program which controls downloading a new BIOS into the flash ROM 164 is executing. After a password has been downloaded to the security device at boot-up as described above, a PROTECT RESOURCES command can be issued to the security device. To gain access, the user provides the correct password to the security device, and the security device allows access to the secured features. Security is enhanced in the preferred embodiment in that the password cannot be obtained from the security device: the password is initially written to it, and the security device can verify a password, but the security device cannot divulge the password. Additionally, the security device controls the access. If code running on the processor could control the access, then an attacker would only need to find out which bits to twiddle to unlock it. As the security device cannot provide the password and the CMOS memory is locked before the computer system S is booted so that the administrator password also cannot be read, the password is not available once the computer system S has left secure code. Therefore an attacker cannot utilize software to access the protected device.

As shown in FIG. 15, after entry in step 676, the software issues an Access Resources command to the BIOS handler at step 678. The BIOS handler then executes as described above. The software in step 680 then checks to determine if the failure flag is set or a failure to provide the proper password occurred. If the access was not successful, control proceeds to step 682 where the failure is indicated to the user and then to step 690 where the sequence ends.

If the access was successful, the resource is unlocked and in step 684 the desired access is made to the resource, such as writing a new BIOS to the flash ROM 164. After the access is completed, successfully or unsuccessfully, a Protect Resources command is issued to the security device at step 688 before exiting at step 690. This action once again enables the security checking by the security device and the sequence starts all over again.

The password is changed in the preferred embodiment by changing the administrator password using existing configuration operations. If desired, a separate program could be provided, particularly if a password other than the administrator password is utilized in the security device. The program would call the BIOS handler with an Access Resource request. If successful, the program would then call the BIOS handler with a Store Password request. In the Store Password request the BIOS handler would obtain the new password, preferably confirm it, and then would issue the STORE_PASSWORD command to the security device and then provide the new password to the security device. The program would then issue a Protect Resources request to the BIOS handler.

Thus, a security device is disclosed for securing the computer having the system ROM provide a password at power-on to a security device which controls access to the secured features. Since the security device can only verify the password and not divulge it, security of the system is enhanced.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A security device for protecting at least one resource of a computer system, the resource having a protected state and an unprotected state, access to the resource being controlled by a password code, comprising:

a memory device, comprising:

at least one memory slot for securely storing the password code, the memory slot having a locked state and an unlocked state;

a status/data register for receiving a user-entered software key code; and comparator logic coupled to the memory slot of the memory device and the status/data register, the comparator logic in response to a command asserting an unlock signal to the memory slot to place the memory slot in an unlocked state if the user-entered software key code matches the password code without allowing reading of the password code.

2. The security device of claim 1, the status/data register storing the user-entered software key code, wherein the memory slot stores the user-entered software key code of the status/data register in response to a store password command.

3. The security device of claim 1, the status/data register storing the user-entered software key code, wherein the comparator logic compares the user-entered software key code of the status/data register with the password code stored in the memory slot in response to an access resource command.

4. The security device of claim 1, wherein a lock signal is asserted to lock the memory slot after storing the user-entered software key code to the memory slot in response to a protect resource command.

5. The security device of claim 1, wherein in response to a permanently protect resource command after storing the user-entered software key code to the memory slot, a permanently lock signal is asserted to lock the memory slot until power to the computer system is cycled.

6. The security device of claim 1, wherein a status of the memory slot is provided in response to a read status command.

7. The security device of claim 1, further comprising:

a command register for receiving a plurality of commands for controlling the security device.

8. The security device of claim 7, the command register comprising:

bits for storing a slot index corresponding to the memory slot.

9. The security device of claims 7, the command register comprising:

bits for storing a command code for a command to be executed by the security device.

10. The security device of claim 1, wherein the status/data register functions as a data register for a write cycle of the security device and functions as a status register for a read cycle of the security device.

11. The security device of claim 10, wherein the status/data register for a read cycle comprises:

bits for storing a slot index corresponding to a memory slot;

bits for indicating whether a memory slot is in a permanently locked state, the memory slot being locked until power to the computer system is cycled when the memory slot in a permanently locked state; and bits for indicating whether a memory slot is in a locked state.

12. The security device of claim 1, further comprising:

a plurality of additional memory slots for storing additional password codes, the additional password codes protecting additional resources of the computer system, wherein the comparator logic is further configured to assert additional unlock signals to the additional memory slots if the user-entered software key code matches the additional password codes.

* * * * *